(12) United States Patent
Takeuchi

(10) Patent No.: US 6,262,611 B1
(45) Date of Patent: Jul. 17, 2001

(54) HIGH-SPEED DATA RECEIVING CIRCUIT AND METHOD

(75) Inventor: Masahiro Takeuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/599,570

(22) Filed: Jun. 23, 2000

(30) Foreign Application Priority Data

Jun. 24, 1999 (JP) ................................. 11-178769

(51) Int. Cl.[7] ................................. H03L 7/089
(52) U.S. Cl. ................... 327/159; 327/160; 327/150
(58) Field of Search ............... 327/94, 156, 160, 327/161, 151, 150, 141, 147, 149, 159

(56) References Cited

U.S. PATENT DOCUMENTS 5,317,283 * 5/1994 Korhonen ........................ 327/159
6,064,244 * 5/2000 Wakeyama et al. .............. 327/147

* cited by examiner

Primary Examiner—Dinh T. Le
(74) Attorney, Agent, or Firm—Sughrue, Mion, Zinn, Macpeak & Seas, PLLC

(57) ABSTRACT

A high-speed data receiving circuit allowing correct and reliable data reception without the need for adjusting delays in circuits and interconnections is disclosed. A sampling circuit samples received data according to first, second, and third clock signals to produce first, second, and third streams of data. The first, second, and third clock signals sequentially have a predetermined phase difference between adjacent ones. A clock generator generates the first, second, and third clock signals having phases determined depending on a clock selection signal obtained by comparing the first, second, and third streams of data. The second clock signal is selected as an output clock signal and the second stream of data corresponding to said second clock signal is selected as an output data of the high-speed data receiving circuit.

19 Claims, 8 Drawing Sheets

HIGH-SPEED DATA RECEIVING CIRCUIT AND METHOD

BACKGROUND OF THE INVENTION

1. Field of the Invention

The present invention relates to data receiving techniques in a high-speed data transmission system. In particular, the invention relates to a high-speed data receiving circuit and method allowing reliable data reception even when a received clock signal and/or the received data vary in phase.

2. Description of the Prior Art

In Japanese Patent Application Unexamined Publication No. 10-247903, a bit-sync circuit has been disclosed in which the phase of received data is compared with the phases of multiple clock signals generated from a system clock signal and a clock signal having a phase to be used for data capturing is selected from the multiple clock signals depending on a comparison result.

More specifically, the above conventional circuit in the case of 4-phase clock signals as describe din the Publication No. 10-247903 will be described referring to FIG. 8.

As shown in FIG. 8, this conventional example is composed of the following circuits. Delay circuits 101a–101c receive a system clock signal and generates multiple clock signals by delaying the system clock signal by different delay times. A phase comparison pulse generator 102 inputs received data and 4-phase clock signals (that is, the system clock signal and the clock signals obtained by the delay circuits 101a–101c), and generates a received data phase signal and clock phase signals, which have a constant pulse width, based on leading-edges and trailing-edges of the received data and leading-edges of the system clock signal and the multiple clock signals obtained by the delay circuits 101a–101c.

A phase selector 103 selects one of the clock phase signals output from the phase comparison pulse generator 102 in accordance with a received phase selection signal SEL. A clock selector 104 selects one of the system clock signal and the multiple clock signals that are output from the delay circuits 101a–101c in accordance with a received phase selection signal SEL. A phase comparator 105 compares the phase of the received data phase signal output from the phase comparison pulse generator 102 and the phase of the selected clock phase signal output from the phase selector 103.

A phase decision circuit 106, which is an up/down counter, generates a phase selection signal SEL to be output to the phase selector 103 and the clock selector 104 depending on a comparison result of the phase comparator 105. A latch circuit 107 latches the received data according to the clock signal selected by the clock selector 104. The selected clock signal is output as an output clock signal.

In the above conventional circuit, the phase comparator 105 compares the phase of the received data phase signal and the phase of a selected clock phase signal that is selected by the phase selector 103. A comparison result of the phase comparator 105 is output to the phase decision circuit 106.

If the comparison result indicates a possibility that the received data phase signal and the selected clock phase signal do not provide a sufficient setup time, then the phase decision circuit 106 generates a phase selection signal SEL that causes the phase of a clock signal selected by the phase selector 103 to be delayed so as to increase the setup time.

If the comparison result indicates a possibility that the received data phase signal and the selected clock phase signal do not provide a sufficient hold time, then the phase decision circuit 106 generates a phase selection signal SEL that causes the phase of a clock signal selected by the phase selector 103 to be advanced so as to increase the hold time.

If the comparison result indicates that the received data phase signal and the selected clock phase signal satisfy both of sufficient setup time and hold time, the phase decision circuit 106 generates a phase selection signal SEL that causes the phase of a clock signal selected by the phase selector 103 to be kept. The phase selection signal SEL thus generated is output to the phase selector 103 and the clock selector 104.

The clock selector 104 selects one of the system clock signal and the multiple clock signals obtained by the delay circuits 101a–101c depending on the phase selection signal SEL, and outputs it as an output clock signal.

The clock signal that is output as the output clock signal from the clock selector 104 is also input to the latch circuit 107. The latch circuit 107 captures the received data according to the finally selected clock signal, and outputs the resulting data as output data.

However, in the above conventional circuit, the received data actually latched by the latch circuit 107 takes a different route than the received data phase signal that reaches the phase comparator 105 via the phase comparison pulse generator 102 for clock phase adjustment. A clock signal that is actually selected by the clock selector 104 also takes a different route than a selected clock phase signal that reaches the phase comparator 105 via the phase comparison pulse generator 102 and the phase selector 103.

A combination of delays in these four routes may cause the reduced reliability of the comparison result obtained by the phase comparator 105. More specifically, even if a comparison result of the phase comparator 105 indicates that both of the setup time and the hold time are satisfied, a clock signal selected by the clock selector 104 does not necessarily satisfy both of the setup time and the hold time when the latch circuit 107 captures received data. This causes a problem such that correct data may not be captured.

For example, consider the case that the delay in the clock selector 104 is a half of one clock cycle and the delays in the circuits other than the clock selector 104 are zero.

In this case, although a phase comparison result of the phase comparator 105 indicates that the phase of the change points of received data and the phase of leading-edges of the clock signal are deviated from each other by only a half of one clock cycle, the phase of the received data input to the latch circuit 107 comes to coincide with the phase of the clock signal input to the latch circuit 107 when the clock signal is delayed in the clock selector 104 by a half of one clock cycle. Actually, since neither the setup time nor the hold time is satisfied, it is impossible to capture correct data.

To avoid such a problem, it is necessary to adjust delays in the circuits and interconnections from branching points 108 and 109 to the latch circuit 107 and the phase comparator 105.

Such adjustments are easy in the case where the frequency of received data is low. However, there is a problem that, as the frequency of received data increases, the delays need to be adjusted so as to fall within a small range and therefore the circuit implementation becomes more difficult.

SUMMARY OF THE INVENTION

The present invention has been made to solve the above problems in the art, and an object of the invention is therefore to provide a high-speed data receiving circuit and method allowing correct and reliable data reception without the need for adjusting delays in circuits and interconnections.

According to the present invention, a high-speed data receiving circuit for receiving data according to a clock signal satisfying predetermined setup time and hold time is provided. The circuit includes a sampling section for sampling received data according to first, second, and third clock signals to produce first, second, and third streams of data corresponding respectively to said first, second, and third clock signals, wherein the first, second, and third clock signals sequentially have a predetermined phase difference between adjacent ones; and a clock generating section for generating the first, second, and third clock signals having phases determined depending on a clock selection signal obtained by comparing the first, second, and third streams of data. The second clock signal is selected as an output clock signal and the second stream of data corresponding to said second clock signal is selected as an output data of the high-speed data receiving circuit.

Generation of the first, second, and third clock signals and sampling of the received data may be repeatedly performed in loop form.

When the first stream of data is not coincided with the second stream of data, the clock generating section preferably generates first, second, and third clock signals delayed by the predetermined phase difference. When the second stream of data is not coincided with the third stream of data, the clock generating section preferably generates first, second, and third clock signals advanced by the predetermined phase difference.

The clock generating section may include a multiphase clock generating section for generating N (N≧4) clock signals sequentially having the predetermined phase difference between adjacent ones from a received clock signal; and a clock selection section for selecting the first, second, and third clock signals from the N clock signals depending on the clock selection signal.

The clock generating section may include a multiphase clock generating section for generating N N≧4) clock signals sequentially having the predetermined phase difference between adjacent ones from a received clock signal; a clock selection section for selecting one from the N clock signals depending on the clock selection signal; and a delaying section for sequentially delaying a selected clock signal by the predetermined phase difference to produce the first, second, and third clock signals.

The clock generating section may further include a clock-selection decision section for generating a clock selection signal for delaying phases of the first, second, and third clock signals by the predetermined phase difference when the first stream of data is not coincided with the second stream of data, and generating a clock selection signal for advancing phases of the first, second, and third clock signals by the predetermined phase difference when the second stream of data is not coincided with the third stream of data. And the clock selection section may select the first, second, and third clock signals from the N clock signals depending on the clock selection signals. The clock selection section may select one from the N clock signals depending on the clock selection signal, and the delaying section sequentially delays a selected clock signal by the predetermined phase difference to produce the first, second, and third clock signals.

The clock selection section may include a selector for selecting one of the N clock signals in accordance with the clock selection signal. The delaying section may include two delay elements connected in series, each of the two delay elements delaying the selected clock signal by the predetermined phase difference.

The clock-selection decision section may include a phase comparator for comparing phases of the first stream of data and the second stream of data to produce an UP signal when the first stream of data is not coincided with the second stream of data and to produce a DOWN signal when the second stream of data is not coincided with the third stream of data; and a counter for incrementing a count value when receiving the UP signal from the phase comparator and decrementing the count value when receiving the DOWN signal from the phase comparator to output the count value as the clock selection signal to the clock selection section. And, the clock selection section may delay the phases of the first, second, and third clock signals when the count value has been incremented, and advances the phases of the first, second, and third clock signals when the count value has been decremented. The clock selection section may delay a phase of the selected clock signal when the count value has been incremented, and advances the phase of the selected clock signal when the count value has been decremented.

In the high-speed data receiving circuit according to the invention, the sampling section captures three data of received data according to the three clock signals having predetermined phase differences. The clock generating section compares the three data captured by the sampling section. When the first data that has been captured according to a most advanced clock signal is different from the second data that has been captured according to a clock signal having a central phase, the clock generating section outputs three clock signals that are delayed in phase from the currently used three clock signals. When the second data is different from the third data that has been captured according to the clock signal having a most delayed phase, the clock generating section outputs three clock signals that are advanced in phase from the currently used three clock signals. The sampling section captures the received data according to the three clock signals thus output form the clock generating section. The sampling section outputs, as an output clock signal, the second clock signal, and outputs, as output data, the second data that has been captured according to the second clock signal.

Since in this manner the clock signal phase adjustment is performed based on data that is captured according to a clock signal that is actually output as an output clock signal, it is not necessary to adjust delays in circuits and wiring. Further, since the selection of three clock signals and the sampling of received data are repeated in loop form, adaptation to a variation in the phase relationship between a reception clock and the received data can always be made.

In a configuration in which the selecting means outputs the three clock signals by selecting only one clock signal and generating two clock signals by delaying the selected one clock signal, the phase differences among the three clock signals can be set arbitrarily.

DETAILED DESCRIPTION OF THE PREFERRED EMBODIMENTS

CIRCUIT CONFIGURATION

Figure 1:
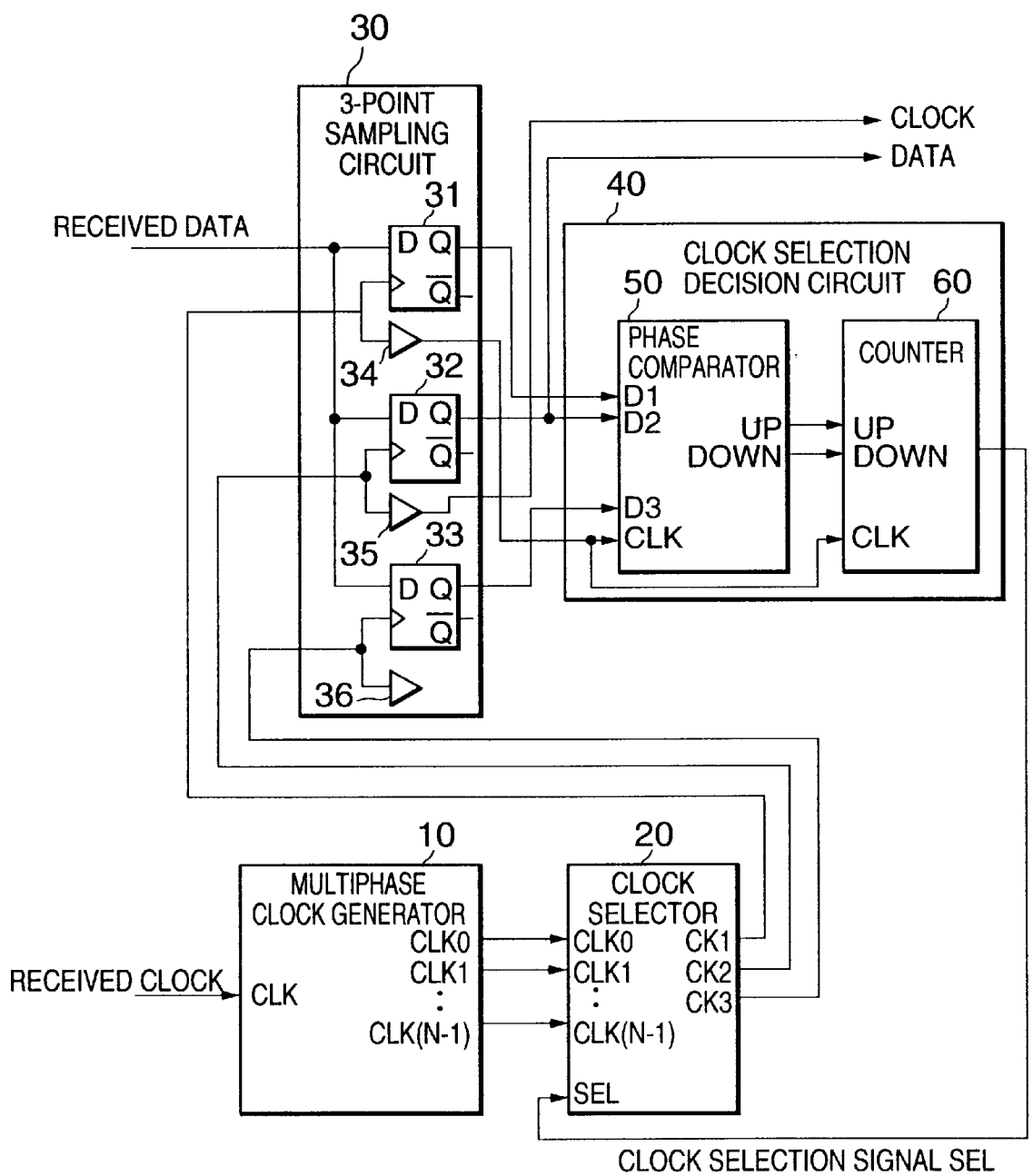
FIG. 1 is a block diagram showing a high-speed data receiving circuit according to an embodiment of the present invention.

Referring to FIG 1, a high-speed data receiving circuit according to an embodiment of the present invention is composed of the following circuits. A multiphase clock generator 10 delays a received clock signal to generate N multiphase clock signals, CLK0–CLK(N-1), in such a manner that the delay increases stepwise by 1/N (N≧4) of one cycle of the received clock signal. A clock selector 20 selects three clock signals CK1–CK3 having predetermined phase differences from the multiphase clock signals CLK0–CLK(N-1) in accordance with a received clock selection signal SEL. The three selected clock signals CK1–CK3 are output to a 3-point sampling circuit 30.

The 3-point sampling circuit 30 is provided with three flip-flop circuits 31–33 that input the received data at the leading-edge time points of the three clock signals CK1–CK3 and produce three steams of data D1–D3, respectively. The details of the 3-point sampling circuit 30 will be described later.

A clock selection decision circuit 40 receives three streams of data D1–D3 that have been captured by the 3-point sampling circuit 30 according to the three clock signals CK1–CK3, respectively. The clock selection decision circuit 40 compares the three streams of data D1–D3 and generates a clock selection signal SEL based on the comparison result. The clock selection signal SEL is output to the clock selector 20. The clock selector 20 outputs three clock signals in accordance with the clock selection signal SEL in a predetermined manner, which will be described later.

The 3-point sampling circuit 30 is composed of the following circuits. The flip-flop circuit 31 inputs received data according to the clock signal CK1 that is most advanced in phase among three clock signals CK1–CK3 that are selected by the clock selector 20. The clock signal CK1 is further supplied to the clock selection decision circuit 40 through a buffer 34. The flip-flop circuit 32 inputs the received data according to the clock signal CK2 that is central in phase among the three clock signals CK1–CK3. The clock signal CD2 is output as an output clock signal through a buffer 35. The flip-flop circuit 33 inputs the received data according to the clock signal CK3 that is most delayed in phase among the three clock signals CK1–CK3. The clock signal CK3 is output to a buffer 36 that is used to make adjustments so that the magnitude of capacitive load for the most delayed clock signal CK3 becomes equal to the capacitive loads of the other two clock signals CK1 and CK2. Data that is output from the flip-flop circuit 32 is used as output data, and the clock signal that is output from the buffer 35 is used an output clock signal.

The clock selection decision circuit 40 is composed of a phase comparator 50 and a counter 60. The phase comparator 50 receives the three streams of data D1–D3 that are output from the 3-point sampling circuit 30. The phase comparator 50 compares the three streams of data D1–D3 according to the clock signal supplied from the buffer 34 and decides based on a comparison result whether to advance or delay the phase of clock signals to be selected by the click selector 20. The decision result is output as an up/down instruction to the counter 60.

The counter 60 is an up/down counter working according to the clock signal supplied from the buffer 34. Depending on the decision result inputted from the phase comparator 50, the counter 60 increments or decrements its count value and outputs the count value as a clock selection signal SEL to the clock selector 20.

CLOCK SELECTOR

Figure 2:
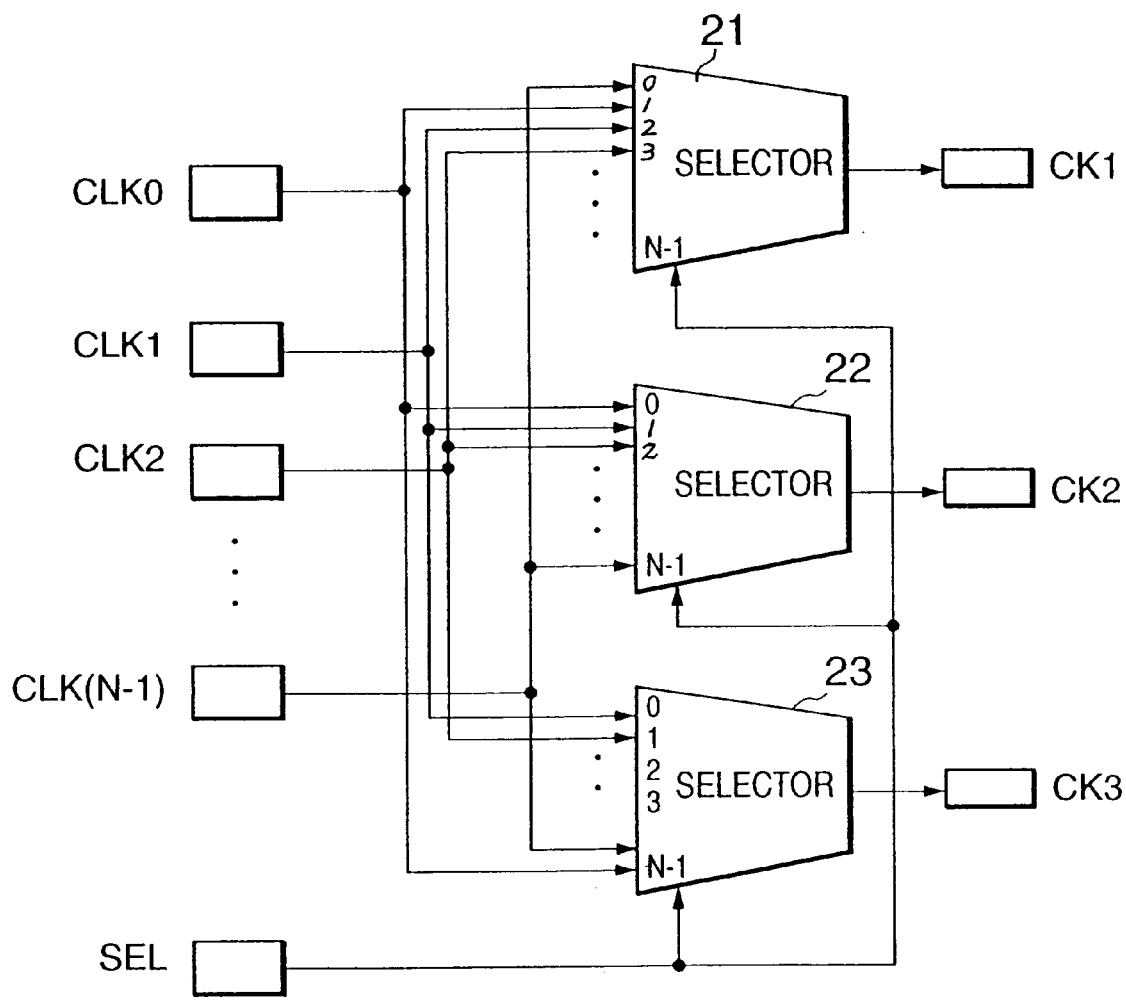
FIG. 2 is a block diagram showing an example configuration of a clock selector shown in FIG. 1.

Referring to FIG. 2, the clock selector 20 is composed of three selectors 21–23. Each of the selectors 21–23 receives the multiphase clock signals CLK0–CLK(N-1) generated by the multiphase clock generator 10, and further receives the clock selection signal SEL from the clock selection decision circuit 40. More specifically, the multiphase clock signals CLK0–CLK(N-1) are received by the selectors 21–23 in rotation such that a clock signal CLKk (k is any of 0, 1, 2, ..., N-1) is received at the (k+1)-th input of the selector 21, the k-th input of the selector 22, and the (k-1)-th input of the selector 23, wherein the 0-th input of the selector 21 receives the clock signal CLK(N-1) and the (N-1)-th input of the selector 23 receives the clock signal CLK0.

In the clock selector 20 having the above configuration, each of the selectors 21–23 selects one of the received clock signals CLK0 to CLK(N-1) in accordance with the clock selection signal SEL. The clock signal selected by the selector 21 is output as a clock signal CLK1, the clock signal selected by the selector 22 is output as a clock signal CK2, and the clock signal selected by the selector 23 is output as a clock signal CK3. As a result, adjacent ones of the three clock signals CK1 to CK3 have a phase difference of 1/N of one cycle and are arranged in phase-delaying order; CK1, CK2, and CK3 (the phase of CK1 is most advanced).

PHASE COMPARATOR

Figure 3:
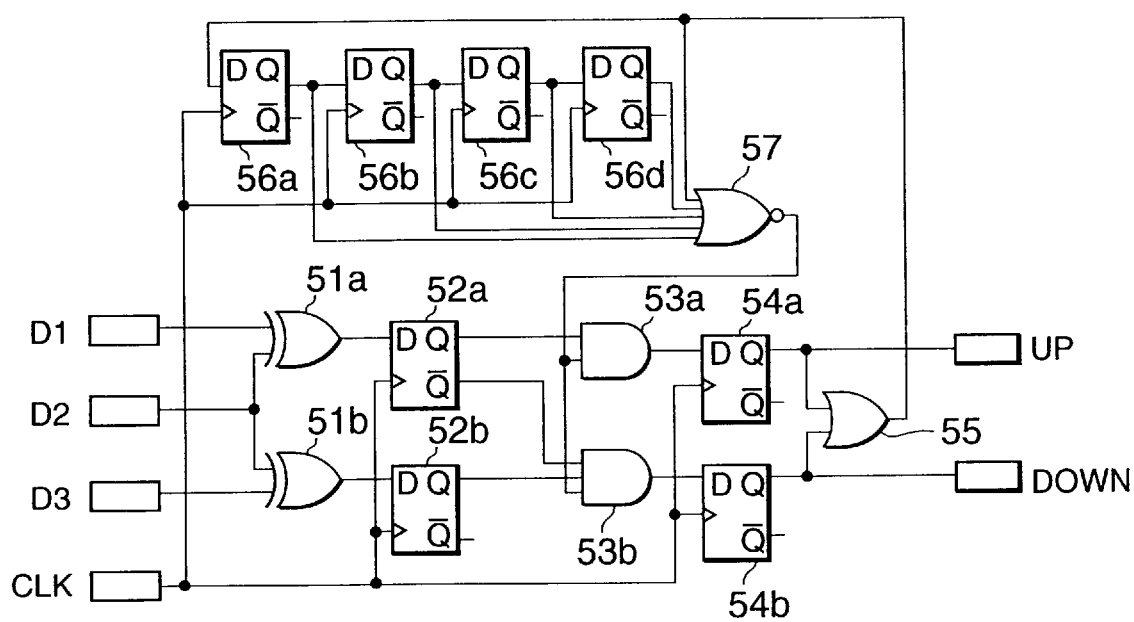
FIG. 3 is a circuit diagram showing an example configuration of a phase comparator shown in FIG. 1.

Referring to FIG. 3, the phase comparator 50 is formed as follows. An XOR gate 51a EXCLUSIVE-ORs the data D1 and D2 that are received from the flip-flop circuits 31 and 32 of the 3-point sampling circuit 30, respectively. An XOR gate 51b EXCLUSIVE-ORs the data D2 and D3 that are received from the flip-flop circuits 32 and 33 of the 3-point sampling circuit 30, respectively. A flip-flop circuit 52a inputs the output of the XOR gate 51a according to a clock signal supplied from the 3-point sampling circuit 30 (corresponding to the click signal CK1). A flip-flop circuit 52b inputs the output of the XOR gate 51b according to the click signal supplied from the 3-point sampling circuit 30 (corresponding to the clock signal CK1).

The output and inverted output of the flip-flop circuit 52a are output to AND gates 53a and 53b, respectively. The output of the flip-flop circuit 52b is output to the AND gate 53b. The output of a NOR gate 57 is connected to the respective inputs of the AND gates 53a and 53b. The respective outputs of the AND gates 53a and 53b are connected to flip-flop circuits 54a and 54b that are supplied with the clock signal corresponding to the clock signal CK1 by the 3-point sampling circuit 30. The outputs of the flip-flop circuits 54a and 54b are ORed by an OR gate 55 and the output of the OR gate 55 is connected to the input of a flip-flop circuit 56a and an input of the NOR gate 57.

The click signal received from the 3-point sampling circuit 30 (corresponding to the clock signal CK1) is also supplied to flip-flop circuits 56a to 56d connected in series and the output of each of the flip-flop circuits 56a to 56d is input to the NOR gate 57.

In the circuit composed of the AND gates 53a and 53b, the flip-flop circuits 54a and 54b, the OR gate 55, the flip-flop circuits 56a–56d, and the NOR gate 57, when "1" is set to the flip-flop circuit 52a, the flip-flop circuit 54a outputs an UP signal composed of one pulse of "1" and then "0" in the subsequent 5-clock period. When "1" is set in the flip-flop circuit 52b, the flip-flop circuit 54b outputs a DOWN signal composed of one pulse of "1" and then outputs "0" in the subsequent 5-clock period. When "1" is set in both of the flip-flop circuits 52a and 52b simultaneously, priority is given to the flip-flop circuit 52a.

OPERATION

An operation of the high-speed data receiving circuit having the above configuration will be described with reference to FIG. 4 and FIG. 5. For simplicity, FIG. 4 shows an operation in which the multiphase clock generator 10 generates 8-phase clock signals CLK0–CLK7.

Figure 4:
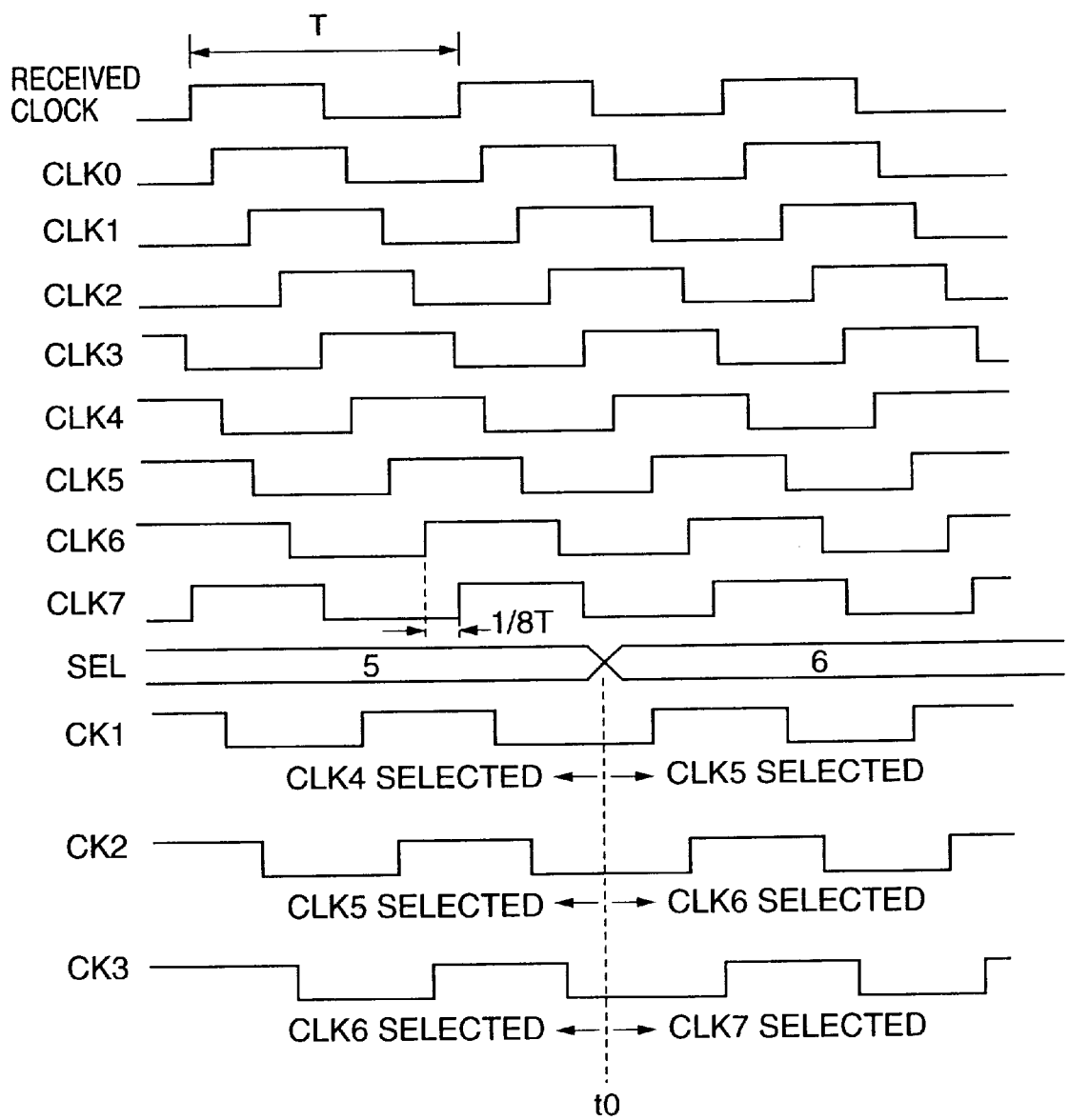
FIG. 4 is a timing chart showing the operation of the high-speed data receiving circuit of FIGS. 1–3.

Referring to FIG. 4, when receiving a received clock signal, the multiphase clock generator 10 generates N(=8) multiphase clock signals that are delayed stepwise in order by 1/N (N≧4) of one cycle or period T of the received clock signal. In this embodiment, eight clock signals CLK0 to CLK7 are generated.

The eight clock signals CLK0 to CLK7 generated by the multiphase clock generator 10 are output to the clock selector 20. The clock selector 20 selects three clock signals CL1 to CK3, adjacent ones of which have a phase difference of 1/N of one cycle T from the click signals CLK0 to CLK7 in accordance with a clock selection signal SEL received from the click selection decision circuit 40.

Assuming that the clock selection signal SEL is switched from SEL="5" to "6" at time T0 as shown in FIG. 4, the clock signals CK1 to CK3 are switched accordingly. When the click selection signal SEL is "5," the clock signal CLK4 is selected and output as the clock signal CK1, the clock signal CLK5 is selected and output as the clock signal CK2, and the clock signal CLK6 is selected and output as the clock signal CK3. When the clock selection signal SEL is changed to "6" at the time t0, the clock signal CLK5 is selected and output as the clock signal CK1, the clock signal CLK6 is selected and output as the clock signal CK2, and the clock signal CLK7 is selected and output as the clock signal CK3. In other words, a clock signal selected from the clock signals CLK0 to CLK7 as a clock signal CK1 is indicated by CLK(SEL−1), a clock signal as the clock signal CK2 is indicated by CLK(SEL), and a clock signal as the clock signal CK3 is indicated by CLK(SEL+1).

In this manner, adjacent ones of the clock signals CK1 to CK3 have a phase difference of ⅛ of one cycle T. In this embodiment, for the sake of simplicity, it is assumed that the delays occurring in the selectors 21–23 are zero.

The clock signals CK1 to CK3 are output to the 3-point sampling circuit 30. In the 3-point sampling circuit 30, the buffers 34–36 input the clock signals CK1 to CK3, respectively, and the flip-flop circuits 31–33 input received data at the leading-edge time points of the clock signals CK1 to CK3, respectively. The captured data D1–D3 in the flip-flop circuits 31–33 are output to the clock selection decision circuit 40.

In the clock selection decision circuit 40, the data D1 received from the flip-flop circuit 31 is compared with the data D2 received from the flip-flop circuit 32 by the XOR gate 51a of the phase comparator 50 and its comparison result is stored in the flip-flop circuit 52a. Therefore, when "1" is set in the flip-flop circuit 52a, a change point of the received data should exist between the leading-edge time points of the clock signals CK1 and CK2. In this case, it is determined that the setup time margin is short and one pulse of "1" is output as an UP signal. This causes the count value of the counter 60 to be incremented and the clock selection signal SEL comes to reflect the increment.

As a result, the respective clock signals CK1 to CK3 that are selected by the clock selector 20 from the clock signals CLK0 to CLK 7 become clock signals CLK(SEL−1), CLK (SEL), and CLK(SEL+1) whose phases are delayed according to the clock selection signal SEL varying as the count value of the counter 60 is incremented by 1. Therefore, the setup time margin of the flip-fop circuit 32 is increased.

On the other hand, the data D2 received from the flip-flop circuit 32 is compared with the data D3 received from the flip-flop circuit 33 by the XOR gate 51b of the phase comparator 50 and its comparison result is captured by the flip-flop circuit 52b. Therefore, when "1" is set in the flip-flop circuit 52b, a change point of the received data should exist between the leading-edge time points of the clock signals CK2 and CK3. In this case, it is determined that the hold time margin is short and one pulse of "1" is output as a DOWN signal. The count value of the counter 60 is decremented and the clock selection signal SEL comes to reflect the decrement.

As a result, the three clock signals CK1 to CK3 that are selected by the clock selector 20 from the clock signals CLK0 to CLK7 become clock signals CLK(SEL−1), CLK (SEL), and CLK(SEL+1) whose phases are advanced according to the clock selection signal SEL varying as the count value of the counter 60 is decremented by 1. Therefore, the hold time margin of the flip-flop circuit 32 is increased.

When both of the outputs of the flip-flop circuits 52a and 52b are "0," a change point of the received data should not exist between the leading-edge time points of the clock signals CK1 and CK2 nor between the leading-edge time points of the clock signals CK2 and CK3. In this case, it is determined that both of the setup time margin and the hold time margin are sufficiently long and "0" is output as UP and DOWN signals. Therefore, the counter 60 maintains the current count value. This causes the phases of the clock signals CK1 to CK3 not to be changed, maintaining a state that both of the setup time margin and the hold time margin are sufficiently long.

When both of the outputs of the flip-flop circuits 52a and 52b are "1," a change point of the received data should exist between the leading-edge time points of the clock signals CK1 and CK2 and between the leading-edge time points of the clock signals CK2 and CK3. This is an abnormal state that does not occur usually. In this case, "1" is output from the phase comparator 50 as an UP signal and the count value of the counter 60 is incremented.

As described above, if non-coincidence is detected as a result of comparison between outputs of the flip-flop circuits 31–33 and it is judged that the setup time margin or the hold time margin is short, then the clock signals CK1–CK3 are switched so that the short margin is increased. After the switching of the clock signals CK1–CK3, the above-described comparing operation is restarted. If the setup time margin or the hold time margin becomes short due to a variation in power source voltage or temperature, then the clock signals CK1–CK3 are similarly switched again.

Several clocks are needed from when one pulse of "1" is output as an UP signal or DOWN signal due to detection of non-coincidence between outputs of the flip-flop circuits 31–33 to when the above comparison is restarted after switching of the clock signals CK1–CK3. In this embodiment, the flip-flop circuits 56a–56d and the NOR gate 57, which are provided in the phase comparator 50, serve to disregard comparison results in the flip-flop circuits 52a and 52b during a 5-clock period after the output of one pulse of "1" as an UP signal or a DOWN signal. Although the four flip-flop circuits 56a–56d are provided in this embodiment, the number of flip-flop circuits may be increased or decreased in accordance with the time period that is required until restart of comparison.

CLOCK SELECTION DECISION

An operation of the clock selection decision circuit 40 based on the operation of the 3-point sampling circuit 30 will be described below.

Figure 5:
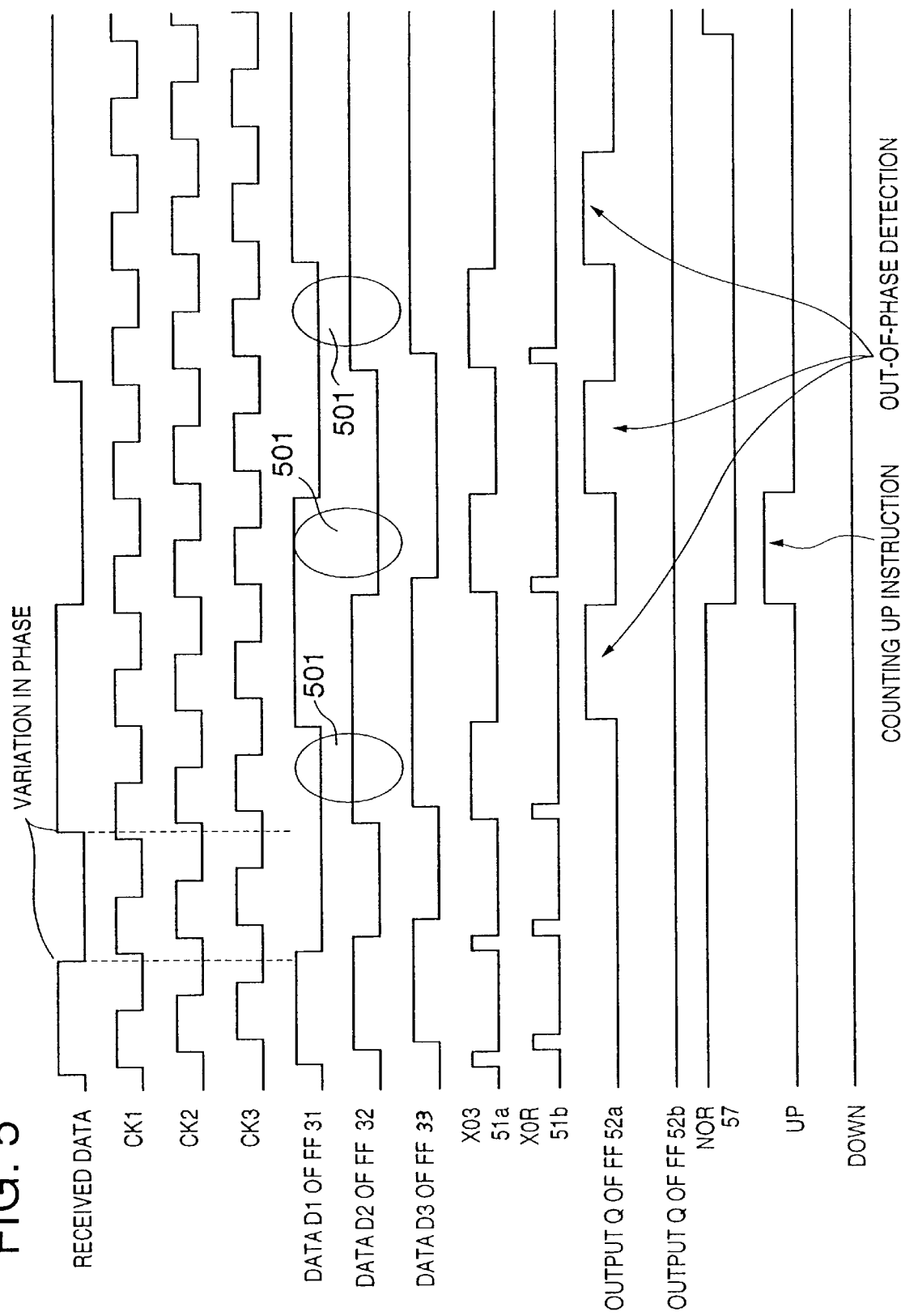
FIG. 5 is a timing chart showing the operations of a 3-point sampling circuit and a clock selection decision circuit shown in FIGS. 1–3.

Referring to FIG. 5, first, received data is captured by the flip-flop circuit 31 at a leading-edge time point of a clock signal CK1 and is output to the phase comparator 50 as data D1. The received data is captured by the flip-flop circuit 32 at a leading-edge time point of a clock signal CK2 and is output to the phase comparator 50 as data D2. The received data is captured by the flip-flop circuit 33 at a leading-edge time point of a clock signal CK3 and is output to the phase comparator 50 as data D3.

The data D1 received from the flip-flop circuit 31 and the data D2 received from the flip-flop circuit 32 are EXCLUSIVE-ORed by the XOR gate 51a of the phase comparator 50. Only when they do not coincide with each other, "1" is output from the XOR gate 51a to the flip-flop circuit 52a.

The data D2 received from the flip-flop circuit 32 and the data D3 received from the flip-flop circuit 33 are EXCLUSIVE-ORed by the XOR gate 51b of the phase comparator 50. Only when they do not coincide with each other, "1" is output from the XOR gate 51b to the flip-flop circuit 52b.

Then, the output of the XOR gate 51a is captured by the flip-flop circuit 52a at a leading-edge time point of the clock signal CK1 and is output to one input terminal of the AND gate 53a. The inverted data of the flip-flop circuit 52a is output to one input terminal of the AND gate 53b. Similarly, the output of the XOR gate 51b is captured by the flip-flop circuit 52b at a leading-edge time point of the clock signal CK1 and is output to another input terminal of the AND gate 53b.

In the initial state, both of the UP output and the DOWN output are "0," the output of the NOR gate 57 is "1." If "1" is output from the flip-flop circuit 52a in this state, then it is captured by the flip-flop circuit 54a at a leading-edge time point of the clock signal CK1 and "1" is output as an UP signal. That is, when the data D1 and the data D2 are different from each other, "1" is output as an UP signal and the number SEL which is used to identify three clock signals CLK(SEL−1), CLK(SEL), and CLK(SEL+1) selected from the clock signals CLK0 to CLK7 is incremented by 1.

If "1" is output from the flip-flop circuit 52b, "1" is captured by the flip-flop circuit 54b at a leading-edge time point of the clock signal CK1 and "1" is output as a DOWN signal. That is, when the data D2 and D3 are different from each other, "1" is output as a DOWN signal and the number SEL which is used to identify three clock signals CLK(SEL−1), CLK(SEL), and CLK(SEL+1) selected from the clock signals CLK0 to CLK7 is decremented by 1.

In FIG. 5, phase variations occur in the received data and three change points of the received data exist between leading-edges of the clock signal CK1 and leading-edges of the clock signal CK2. In this case, "1" is output three times from the flip-flop circuit 52a. However, the OR gate 55 and the flip-flop circuits 56a–56d cause the output of the NOR gate 57 to be "0" during a subsequent 5-clock period. As a result, the second and third pulses are disregarded and "1" is output as an UP signal corresponding to the first pulse.

As described above, in this embodiment, clock signals to be selected are always controlled so that three data captured by the 3-point sampling circuit 30 coincide with each other and adaptation is thereby made to a variation in the phase relationship between received data and received clock signal. As a result, the setup time margin and the hold time margin can be always kept sufficiently long and the data can be received correctly.

Further, the phase comparator 50, which is provided immediately downstream of the 3-point sampling circuit 30, performs phase comparison by using three data that are captured by the 3-point sampling circuit 30. This makes is unnecessary to adjust delays in circuits downstream of branching points unlike the case of the conventional example. Therefore, the data receiving circuit according to this embodiment can be applied to high-speed data reception.

OTHER EXAMPLES OF CLOCK SELECTOR

Figure 6:
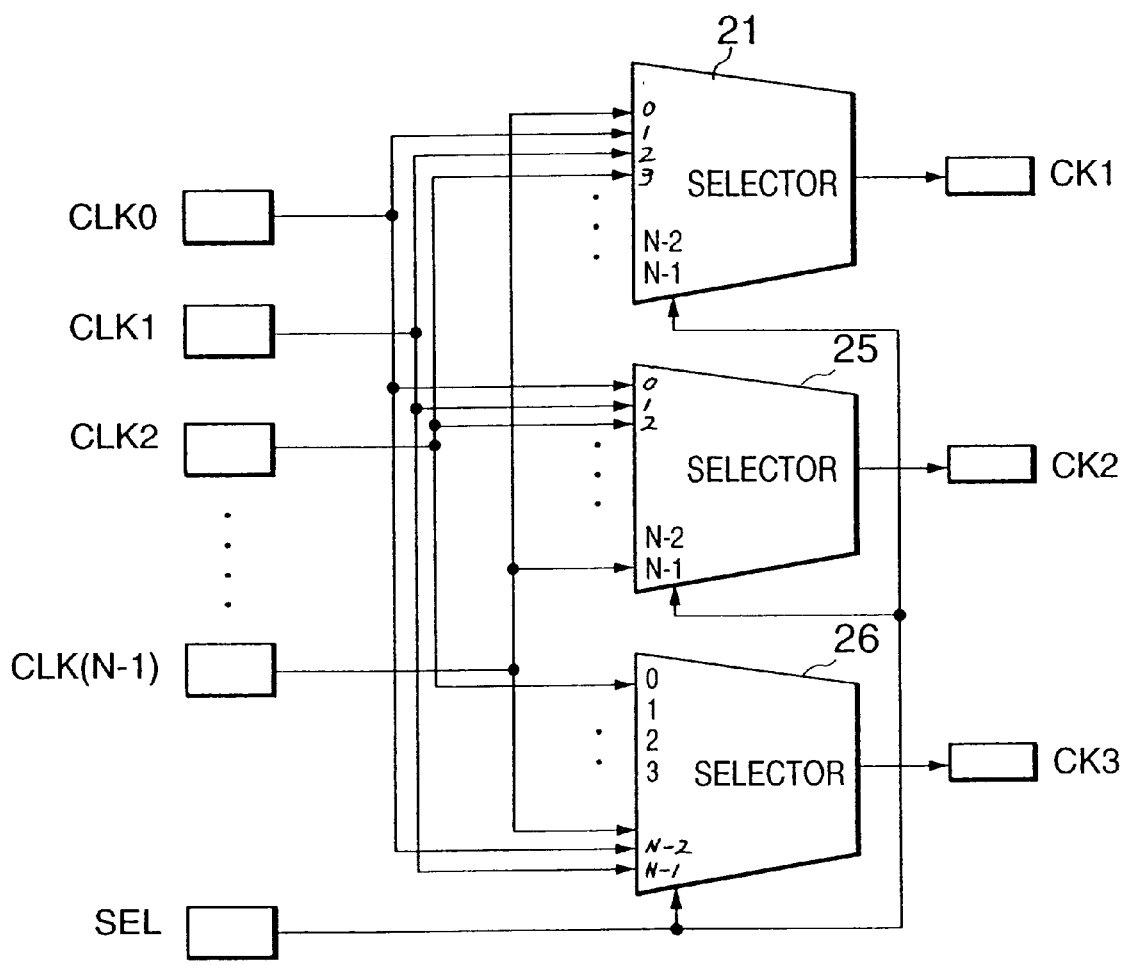
FIG. 6 is a block diagram showing another example configuration of the clock selector shown in FIG. 1.

Referring to FIG. 6, the clock selector 20 may be formed from three selectors 24–26. Each of the selectors 24–26 receives multiphase clock signals CLK0 to CLK(N−1) from the multiphase clock generator 10 and a clock selection signal SEL from the clock selection decision circuit 40. A clock signal CLKk is received at the (k+2)-th input of the selector 24, the k-th input of the selector 25, and the (k−2)-th input of the selector 26. In the clock selector 20 having the above configuration, each of the selectors 24–26 selects one of the received clock signals CLK0 to CLK(N−1) in accordance with the clock selection signal SEL.

The selector 24 selects a clock signal CLK(SEL−2) from the clock signals CLK0 to CLK(N−1) and outputs it as a clock signal CLK1. The selector 25 selects a clock signal CLK(SEL) from the clock signals CLK0 to CLK(N−1) and outputs it as a clock signal CL2. The selector 26 selects a clock signal CLK(SEL+2) from the clock signals CLK0 to CLK(N−1) and outputs it as a clock signal CK3. As a result, the three clock signals CK1 to CK3, adjacent ones of which have a phase difference of 2/N (N≧6) of one cycle, are output from the clock selector 20.

Similarly, it is possible to cause the clock selector 20 to output three clock signals CK1 to CK3, adjacent ones of which have a phase difference of K/N (K≧3, N≧2K+2) of one cycle.

Further, the phase difference between the clock signals CK1 and CK2 and that between the clock signals CK2 and CK3 can be made different from each other For example, setting may be made that the phase difference between the clock signals CK1 and CK2 is 2/N of one cycle and the phase difference between the clock signals CK2 and CK3 is 1/N of one cycle.

Figure 7:
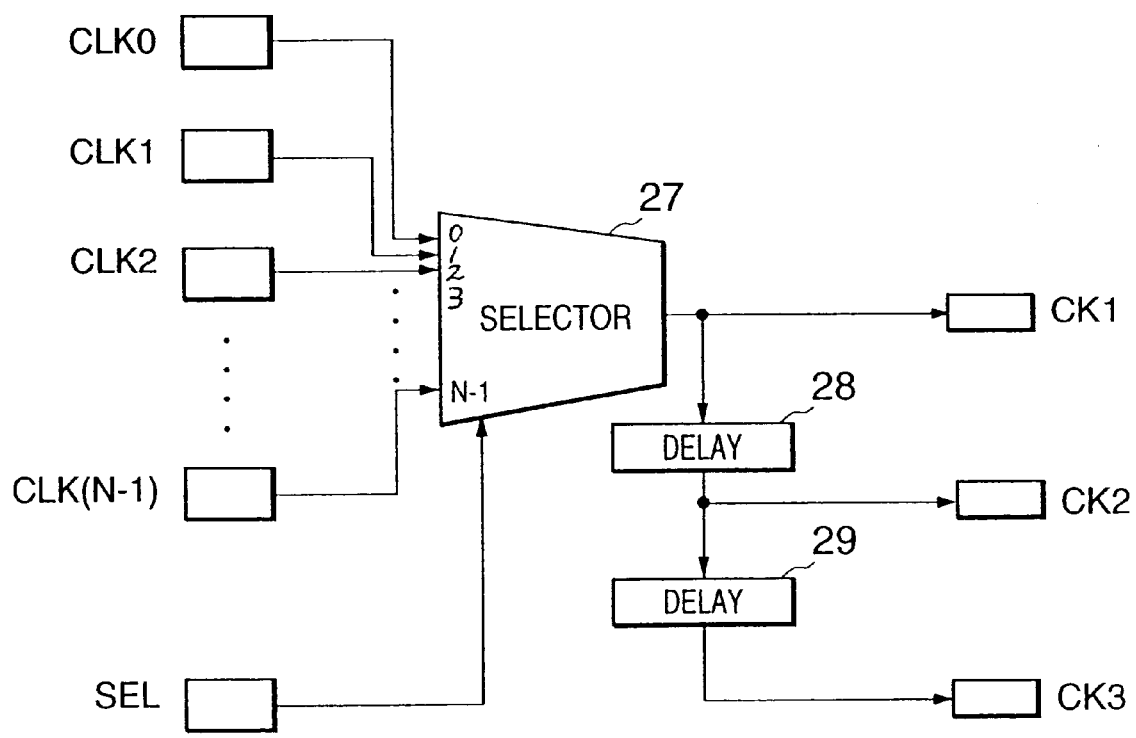
FIG. 7 is a block diagram showing a further example configuration of the clock selector shown in FIG. 1.
Figure 8:
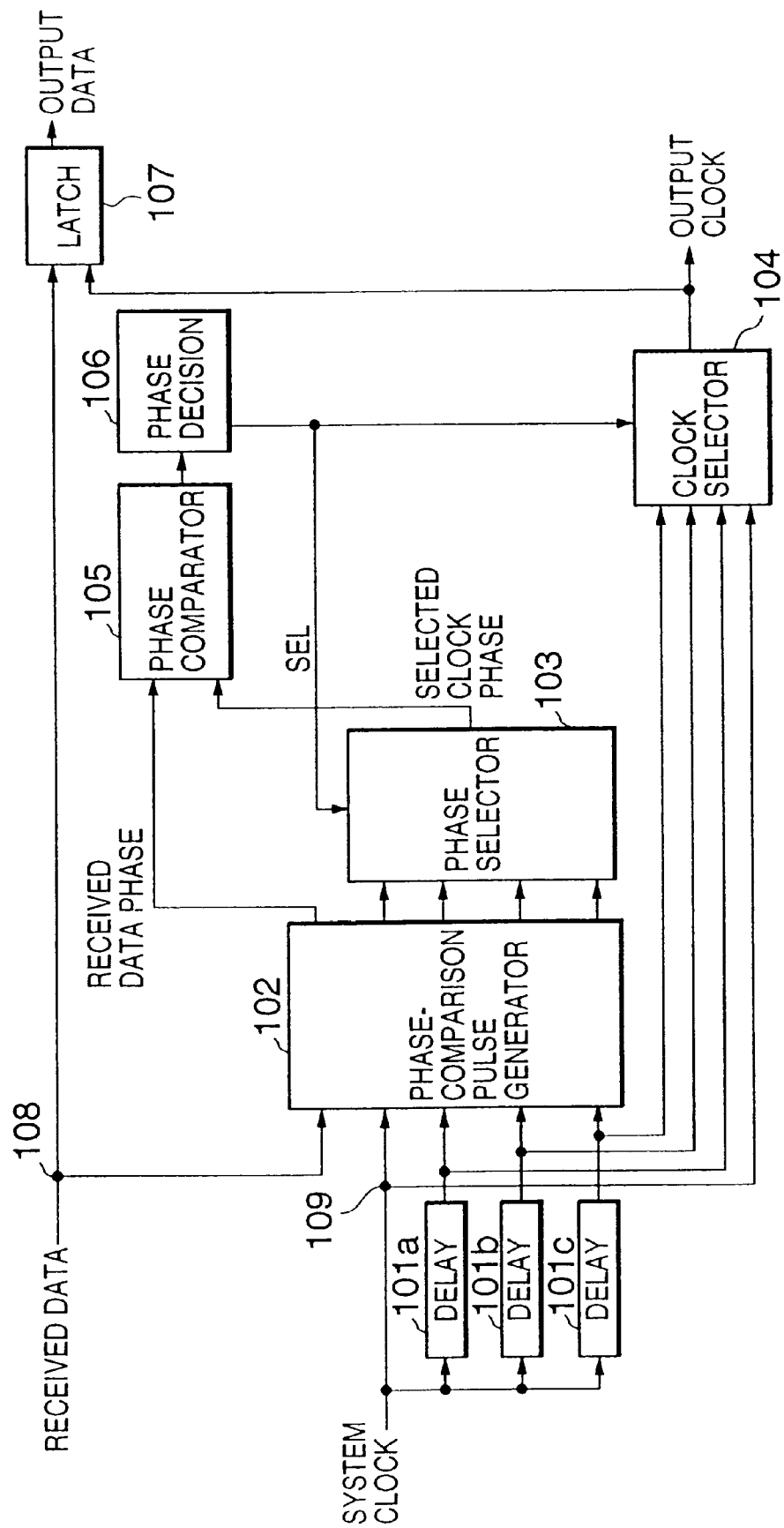
FIG. 8 is a block diagram showing the configuration of a conventional data receiving circuit.

Referring to FIG. 7, the clock selector 20 may be formed from a selector 27 and delay circuits 28 and 29. The selector 27 receives clock signals CLK0 to CLK(N−1) from the multiphase clock generator 10 and a clock selection signal SEL from the clock selection decision circuit 40. The selector 27 selects one of the clock signals CLK0 to CLK (N−1) in accordance with the selection signal SEL and outputs it as a clock signal CK1. A delay circuit 28 inputs the clock signal CK1 from the selector 27 and delays it by a predetermined delay and outputs the delayed clock signal as a clock signal CK2. Similarly, a delay circuit 29 delays the clock signal CK2 input from the delay section 28 by a predetermined delay and outputs it as a clock signal CK3.

In the clock selector 20 having the above configuration, the delays in the delay sections 28 and 29 can be set arbitrarily. Therefore, the phase differences between the clock signals CK1 to CK3 can be set arbitrarily.

As described above, according to the invention, the clock signal phase adjustment is performed based on data captured according to a clock signal that is actually output as an output clock signal. Therefore, received data can be received correctly without the need for adjusting delays in circuits and interconnections.

Since the output of three clock signals by the clock selection section and the capturing of received data by the sampling section are repeated in loop form, the received data can be received correctly even in a case where a slow variation of an environmental factor such as the power source voltage or the temperature causes a variation in the phase relationship between the received clock signal and the received data.

Also in a configuration in which the selecting means generates the three clock signals by selecting only one clock signal and generating two clock signals by delaying the selected one clock signal, in addition to the above advantages, the phase differences among the three clock signals can be set arbitrarily.

What is claimed is:

1. A high-speed data receiving circuit for receiving data according to a clock signal satisfying predetermined setup time and hold time, comprising:
   a sampling section for sampling received data according to first, second, and third clock signals to produce first, second, and third streams of data corresponding respectively to said first, second, and third clock signals, wherein the first, second, and third clock signals sequentially have a predetermined phase difference between adjacent ones; and
   a clock generating section for generating the first, second, and third clock signals having phases determined depending on a clock selection signal obtained by comparing the first, second, and third streams of data,
   wherein the second clock signal is selected as an output clock signal and the second stream of data corresponding to said second clock signal is selected as an output data of the high-speed data receiving circuit.

2. The high-speed data receiving circuit according to claim 1, wherein generation of the first, second, and third clock signals and sampling of the received data are repeatedly performed in loop form.

3. The high-speed data receiving circuit according to claim 1, wherein
   when the first stream of data is not coincided with the second stream of data, the clock generating section generates first, second, and third clock signals delayed by the predetermined phase difference, and
   when the second stream of data is not coincided with the third stream of data, the clock generating section generates first, second, and third clock signals advanced by the predetermined phase difference.

4. The high-speed data receiving circuit according to claim 1, wherein the clock generating section comprises:
   a multiphase clock generating section for generating N (N≧4) clock signals sequentially having the predetermined phase difference between adjacent ones from a received clock signal; and
   a clock selection section for selecting the first, second, and third clock signals from the N clock signals depending on the clock selection signal.

5. The high-speed data receiving circuit according to claim 1, wherein the clock generating section comprises:
   a multiphase clock generating section for generating N (N≧4) clock signals sequentially having the predetermined phase difference between adjacent ones from a received clock signal;
   a clock selection section for selecting one from the N clock signals depending on the clock selection signal; and
   a delaying section for sequentially delaying a selected clock signal by the predetermined phase difference to produce the first, second, and third clock signals.

6. The high-speed data receiving circuit according to claim 4, wherein the clock generating section further comprises:
   a clock-selection decision section for
   generating said clock selection signal for delaying phases of the first, second, and third clock signals by the predetermined phase difference when the first stream of data is not coincided with the second stream of data, and
   generating said clock selection signal for advancing phases of the first, second, and third clock signals by the predetermined phase difference when the second stream of data is not coincided with the third stream of data,
     wherein the clock selection section selects the first, second, and third clock signals from the N clock signals depending on the clock selection signal.

7. The high-speed data receiving circuit according to claim 5, wherein the clock generating section further comprises:
   a clock-selection decision section for
   generating said clock selection signal for delaying phases of the first, second, and third clock signals by the predetermined phase difference when the first stream of data is not coincided with the second stream of data, and
   generating said clock selection signal for advancing phases of the first, second, and third clock signals by the predetermined phase difference when the second stream of data is not coincided with the third stream of data,
     wherein the clock selection section selects one from the N clock signals depending on the clock selecting signal, and the delaying section sequentially delays a selected clock signal by the predetermined phase difference to produce the first, second, and third clock signals.

8. The high-speed data receiving circuit according to claim 7, wherein
   the clock selection section comprises a selector for selecting one of the N-clock signals in accordance with the clock selection signal, and
   the delaying section comprises two delay elements connected in series, each of the two delay elements delaying the selected clock signal by the predetermined phase difference.

9. The high-speed data receiving circuit according to claim 6, wherein the clock-selection decision section comprises:
   a phase comparator for comparing phases of the first stream of data and the second stream of data to produce an UP signal when the first stream of data is not coincided with the second stream of data and to produce a DOWN signal when the second stream of data is not coincided with the third stream of data; and
   a counter for incrementing a count value when receiving the UP signal from the phase comparator and decrementing the count value when receiving the DOWN signal from the phase comparator to output the count value as the clock selection signal to the clock selection section,
   wherein the clock selection section delays the phases of the first, second, and third clock signals when the count value has been incremented, and advances the phases of the first, second, and third clock signals when the count value has been decremented.

10. The high-speed data receiving circuit according to claim 7, wherein the clock-selection decision section comprises:
   a phase comparator for comparing phases of the first stream of data and the second stream of data to produce an UP signal when the first stream of data is not coincided with the second stream of data and to produce a DOWN signal when the second stream of data is not coincided with the third stream of data; and
   a counter for incrementing a count value when receiving the UP signal from the phase comparator and decrementing the count value when receiving the DOWN signal from the phase comparator to output the count value as the clock selection signal to the clock selection section,
   wherein the clock selection section delays a phase of the selected clock signal when the count value has been incremented, and advances the phase of the selected clock signal when the count value has been decremented.

11. The high-speed data receiving circuit according to claim 9, wherein the phase comparator generates neither said UP signal nor said DOWN signal in a predetermined period immediately after generating the UP signal or the DOWN signal.

12. The high-speed data receiving circuit according to claim 10, wherein the phase comparator generates neither said UP signal nor a said DOWN signal in a predetermined period immediately after generating the UP signal or the DOWN signal.

13. A high-speed data receiving method for receiving data according to a clock signal satisfying predetermined setup time and hold time, comprising the steps of:
   a) sampling received data according to first, second, and third clock signals to produce first, second, and third streams of data corresponding respectively to said first, second, and third clock signals, wherein the first, second, and third clock signals sequentially have a predetermined phase difference between adjacent ones;
   b) generating the first, second, and third clock signals having phases determined depending on a clock selection signal obtained by comparing the first, second, and third streams of data; and
   c) selecting the second clock signal as an output clock signal and the second stream of data corresponding to said second clock signal as an output data.

14. The high-speed data receiving method according to claim 13, wherein the steps (a) and (b) are repeatedly performed.

15. The high-speed data receiving method according to claim 13, wherein the step (b) comprises the steps of:
   when the first stream of data is not coincided with the second stream of data, generating said first, second, and third clock signals delayed by the predetermined phase difference; and
   when the second stream of data is not coincided with the third stream of data, generating said first, second, and third clock signals advanced by the predetermined phase difference.

16. The high-speed data receiving method according to claim 13, wherein the step (b) comprises the steps of:
   b.1) generating $N(N \geq 4)$ clock signals sequentially having the predetermined phase difference between adjacent ones from a received clock signal; and
   b.2) selecting the first, second, and third clock signals from the N clock signals depending on the clock selection signal.

17. The high-speed data receiving method according to claim 13, wherein the step (b) comprises the steps of:
   b.1) generating $N (N \geq 4)$ clock signals sequentially having the predetermined phase difference between adjacent ones from a received clock signal;
   b.2) selecting one from the N clock signals depending on the clock selection signal; and
   b.3) sequentially delaying a selected clock signal by the predetermined phase difference to produce the first, second, and third clock signals.

18. The high-speed data receiving method according to claim 16, wherein the step (b) further comprises the steps of:
   generating said clock selection signal for delaying phases of the first, second, and third clock signals by the predetermined phase difference when the first stream of data is not coincided with the second stream of data; and
   generating said clock selection signal for advancing phases of the first, second, and third clock signals by the predetermined phase difference when the second stream of data is not coincided with the third stream of data,
   wherein the first, second, and third clock signals are selected from the N clock signals depending on the clock selection signal.

19. The high-speed data receiving method according to claim 17, wherein the step (b) further comprises the steps of:
   generating said clock selection signals for delaying phases of the first, second, and third clock signals by the predetermined phase difference when the first stream of data is not coincided with the second stream of data; and
   generating said clock selection signal for advancing phases of the first, second, and third clock signals by the predetermined phase difference when the second stream of data is not coincided with the third stream of data,
   wherein one clock signal is selected from the N clock signals depending on the clock selection signal, and the one clock signal is sequentially delayed by the predetermined phase difference to produce the first, second, and third clock signals.

* * * * *

UNITED STATES PATENT AND TRADEMARK OFFICE
CERTIFICATE OF CORRECTION

PATENT NO.   : 6,262,611 B1
DATED        : July 17, 2001
INVENTOR(S)  : Masahiro Takeuchi Page 1 of 1

It is certified that error appears in the above-identified patent and that said Letters Patent is hereby corrected as shown below:

Column 1,
Line 21, delete "describe din" insert -- described --

Column 3,
Line 41, delete "N≧4)" insert -- (N≧4) --

Column 7,
Line 55, delete "CD2" insert -- CK2 --;
Line 32, delete "CL1" insert -- CK1 --

Column 10,
Line 21, delete "is" insert -- it --;
Line 44, delete "CL2" insert -- CK2 --

Signed and Sealed this

Second Day of April, 2002

*Attest:*

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO.    : 6,262,611 B1
DATED         : July 17, 2001
INVENTOR(S)   : Masahiro Takeuchi It is certified that error appears in the above-identified patent and that said Letters Patent is hereby corrected as shown below:

Column 1,
Line 21, delete "describe din" insert -- described --

Column 3,
Line 41, delete "N≧4)" insert -- (N≧4) --

Column 5,
Line 55, delete "CD2" insert -- CK2 --;

Column 7,
Line 32, delete "CL1" insert -- CK1 --

Column 10,
Line 21, delete "is" insert -- it --;
Line 44, delete "CL2" insert -- CK2 --

This certificate supersedes Certificate of Correction issued April 2, 2002.

Signed and Sealed this

Fifth Day of August, 2003

JAMES E. ROGAN
*Director of the United States Patent and Trademark Office*